United States Patent [19]

Inomata et al.

[11] Patent Number: 5,280,401
[45] Date of Patent: Jan. 18, 1994

[54] MAGNETIC RECORDING MEDIUM, METHOD FOR PRODUCING SAME AND MAGNETIC RECORDING APPARATUS

[75] Inventors: Youichi Inomata, Odawara; Yoshiki Kato, Tokyo; Masaki Ohura, Odawara, all of Japan

[73] Assignee: Hitachi, Ltd., Tokyo, Japan

[21] Appl. No.: 796,830

[22] Filed: Nov. 25, 1991

[30] Foreign Application Priority Data

Nov. 26, 1990 [JP] Japan ................... 2-321900

[51] Int. Cl.$^5$ .............................. G11B 5/84
[52] U.S. Cl. .................... 360/97.01; 360/135
[58] Field of Search ............ 360/97.01, 131, 133–135; 427/127–128; 428/611, 900, 928

[56] References Cited

U.S. PATENT DOCUMENTS

| | | | |
|---|---|---|---|
| 3,790,407 | 2/1974 | Merten et al. | 360/134 X |
| 4,087,582 | 5/1978 | Shirahata et al. | 360/134 X |
| 4,567,096 | 1/1986 | Piltingsrud et al. | 360/134 X |
| 4,567,108 | 1/1986 | Lehner et al. | 360/134 X |
| 4,603,091 | 7/1986 | Mukasa et al. | 360/134 X |
| 4,735,840 | 4/1988 | Hedgcoth | 428/65 |
| 5,062,021 | 10/1991 | Ranjan et al. | 360/135 |
| 5,082,709 | 1/1992 | Suzuki et al. | 428/928 X |

FOREIGN PATENT DOCUMENTS 63-98826 4/1988 Japan .

Primary Examiner—John H. Wolff
Attorney, Agent, or Firm—Antonelli, Terry, Stout & Kraus

[57] ABSTRACT

The magnetic recording medium includes a nonmagnetic substrate having different values of surface tension corresponding to surface free energy in a predetermined magnetic recording direction and in the direction substantially perpendicular thereto, a magnetic film epitaxially grown on the nonmagnetic substrate, and a protective film on the magnetic film. The surface of the nonmagnetic substrate is provided with irregular surfaces having gradients of 45 degrees ±10 degrees relative to the substrate surface. The magnetic film has a main component of an easy axis of magnetization in the magnetic recording direction. The hydrogen peroxide aqueous solution and nitric acid used for the surface treatment of the substrate affect differently the critical surface tension. The partial nonmetal layer can be partially worked to provide textures extending in the magnetic recording direction. The nonmagnetic substrate and the magnetic film are respectively made of substantially nickel-phosphorus and cobalt, and the partial nonmetal layer is made of carbon.

32 Claims, 5 Drawing Sheets

CONTACT ANGLE OF SUBSTRATE (CRITICAL SURFACE TENSION)

DEFINITION OF TRACK PITCH REDUCTION

TRACK PITCH REDUCTION = $e_1 + e_2$

MAGNETIC RECORDING MEDIUM, METHOD FOR PRODUCING SAME AND MAGNETIC RECORDING APPARATUS

BACKGROUND OF THE INVENTION

This invention relates to a magnetic recording medium for use in a magnetic storage unit, a method for producing the same and a magnetic recording apparatus using the same.

A thin film magnetic recording medium of large residual magnetization for increasing the recording density of magnetic disks has become the object of public attention in place of the conventional widely-used magnetic recording medium having a coated film of magnetic power and binder mixed.

The thin film magnetic disk having a magnetic thin film is generally produced by sputtering a nonmagnetic metal layer on a nonmagnetic substrate, sputtering a magnetic film on the nonmagnetic metal layer and forming a protective film and, if necessary, a lubricant film on the magnetic film. In this case, the nonmagnetic metal layer is sometimes omitted.

Magnetic disks having large residual magnetic flux and a high recording density capability are disclosed in U.S. Pat. No. 4,735,840 and Japanese Patent Laid-open Gazettes JP-A-63-98826 and JP-A-1-220217.

The above prior art does not consider the magnetic recording medium having in-surface magnetic anisotropy, and does not make the production method clear.

SUMMARY OF THE INVENTION

It is an object of the invention to provide a magnetic recording medium having a magnetic film with controlled surface magnetic anisotropy, a method for producing the same and a magnetic recording apparatus using the same.

It is another object of the invention to provide a magnetic recording medium having magnetic characteristics most suitable for high-density recording, a method for producing the same, and a magnetic recording apparatus using the same.

It is still another object of the invention to provide a magnetic recording medium having an easy axis of magnetization in the recording direction due surface tension corresponding to surface free energy.

The above objects can be achieved by a magnetic recording medium which is formed of a non-magnetic substrate having a surface anisotropy given by the surface tension corresponding to surface free energy, and a magnetic film which is provided on the nonmagnetic substrate and which has a main component of an easy axis of magnetization in parallel with a surface to be recorded or the recording surface and with the recording direction. In addition, a nonmagnetic metal layer is provided between the nonmagnetic substrate and the magnetic film. The surface tension corresponding to the surface free energy is large in the recording direction. The critical surface tension of the nonmagnetic substrate is large in the recording direction. Another magnetic recording medium is proposed which is formed of a nonmagnetic substrate, a desired-material layer formed on the nonmagnetic substrate and having a surface anisotropy in the surface tension corresponding to the surface free energy, and a magnetic film provided on the desired-material layer and having a main component of an easy axis of magnetization in parallel with the recording surface and with the recording direction. In addition, a nonmagnetic metal layer may be provided between the desired-material layer and the magnetic film. In the magnetic film, the coercive force in the recording direction is 1.1 times or above as large as the coercive force in the direction perpendicular thereto. The recording direction of the magnetic disk is circumferential. In the magnetic film, the coercive force in the recording direction is 1000 Oe or above. The desired-material layer of the magnetic recording medium has grooves or textures in the recording direction. The depth of the grooves is substantially equal to the thickness of the desired-material layer.

The above objects can also be achieved by a magnetic recording medium producing method having a process for giving the surface anisotropy to the surface tension corresponding to the surface free energy of the nonmagnetic substrate, and a process for forming the magnetic film on the nonmagnetic substrate. Moreover, the above method may have a process for forming the grooves, or textures in the recording direction, a process for immersing the nonmagnetic substrate in nitric acid, and a process for forming the magnetic film on the nonmagnetic substrate. Furthermore, this method may have a process for forming grooves, or textures in the direction perpendicular to the recording direction, a process for immersing the nonmagnetic substrate in a hydrogen peroxide aqueous solution, and a process for forming the magnetic film on the nonmagnetic substrate. A magnetic recording apparatus is also provided which has a magnetic recording medium having the above layer structure, a rotatable support for supporting the magnetic recording medium, a rotation drive mechanism for rotating the support, a magnetic head disposed to oppose a desired surface of the magnetic recording medium, and a voice coil for carrying, or flying the magnetic head to a desired position on the magnetic recording medium, these components being housed in a case.

In general, in order for the magnetism of a thin film cobalt alloy medium to be optimized for the surface recording, it is necessary that the normal to the (110) plane of the hexagonal closest packed structure of the cobalt atoms be located to be perpendicular to the recording surface or medium surface and that the C-axis be located to be parallel to the recording surface. For this purpose, a method is known in which chromium or an alloy thereof is used for the ground coat film, or underlayer and the magnetic film is epitaxially grown on the (100) plane of the chromium.

In this invention, it is intended that the normal to the (110) plane of the cobalt oriented in the surface of the magnetic film is oriented to be perpendicular to the recording surface and that the C-axis is oriented in the recording direction.

The nonmagnetic substrate surface was treated, or textured chemically, physically, mechanically or by a combination thereof, and a ground film, a magnetic film and a protective film were formed on this substrate by continuous sputtering. The static magnetic characteristics (coercive force, rectangular ratio, S*) of this layer structure were measured. From the measured result, or the relation between the surface state of the substrate and the magnetic characteristics, it was found that giving the surface anisotropy of the surface tension (surface free energy) to the substrate surface was effective for increasing the characteristic values of static magnetism. This effect can also be achieved by forming on a nonmagnetic substrate a nonmangetic layer physically or chemically different from the substrate, and giving the surface anisotropy of the surface tension (surface free energy) to this layer.

The anisotropy of the surface tension corresponding to the surface free energy of the substrate or desired-material film is caused not only by the shape of the formed grooves, or textures but also by the chemical and physical properties of the surface material.

According to a preferred embodiment of this invention, when the nonmangetic metal layer for the ground layer underlying the magnetic film is made of chromium, the (100) plane is oriented. The crystal of chromium, during the initial process of its growth, has its plane (100) oriented up by the force that the internal energy tends to be settled in the stabilized position epitaxial growth). In other words, the closest plane (110) of chromium is oriented to be paralleled to the substrate surface, thereby achieving stabilization. Therefore, the substrate surface is preferably provided with gradients in advance. The (110) plane and (100) plane of chromium make an angle of 45 degrees. Considering this property, the substrate is previously provided with gradients, or irregular surfaces of 45±10 degrees relative to the substrate surface. Then, chromium is epitaxially grown on the irregular surfaces so that the (100) planes can be oriented in the upward direction. In addition, a ferromagnetic cobalt alloy thin film is epitaxially grown on this layer.

The surface of the nonmagnetic substrate or the desired-material layer is treated, or textured chemically, physically, mechanically or by a combination thereof, whereby the surface can be provided with the surface anisotropy of the surface tension corresponding to the surface free energy. When the magnetic film is formed thereon, the direction of the magnetic anisotropy of the magnetic film coincides with that of the anisotropy of the surface tension corresponding to the surface free energy. Thus, by providing the surface anisotropy to the surface free energy of the magnetic substrate or the desired-material layer formed thereon, it is possible to orientate the easy-to-magnetize axis in the recording direction of the recording medium.

The above magnetic characteristics, coercive force Hc, rectangular ratio Rs and the so-called S* will be described first.

The maximum magnetic field (H maximum) applied to the sample is expressed by Hm (Oersted). The intersections of the hysteresis loop with H-axis are called the coercive force Hc (Oersted) as shown in FIG. 1. Normally, this coercive force is the average of +Hc value and −Hc value. The maximum value of the magnetization M(emu) in the hysteresis loop is represented by Mm. The intersections of the hysteresis loop with the M-axis are called residual magnetization Mr(emu) The residual magnetization is normally the average of +Mr and −Mr.

As shown in FIG. 2, the tangents to the hysteresis loop at Hc are drawn, and the intersections of the tangents and M=Mr, H-values, H* (Oersted) are found. Here, the value, S* (S star) is expressed by the following equation:

$$S^* = \frac{Hc}{H^*}$$

Thus, the process of magnetization inversion can be estimated in the hysteresis loop of the sample having a squareness of about 1.

The hysteresis loop of a feromagnetic substance or the like needs the expression of its shape, or squareness. The rectangular ratio Rs for the shape is expressed as $$Rs = \frac{Mr}{Mm}$$

where Rs is the function of the maximum magnetic field Hm.

DESCRIPTION OF THE PREFERRED EMBODIMENTS

Embodiments of the invention will be described in detail.

Embodiment 1

First, a description will be made of a method of providing a surface anisotropy to a nonmagnetic substrate of an aluminum disk plated with nickel-phosphorus.

A nickel-phosphorus (Ni-P) alloy is deposited by electroless plating on a flat-finished aluminum alloy disk, and the plated surface is polished by abrasive powder for a high surface precision. This is hereinafter referred to as the Ni-P substrate.

This Ni-P substrate is textured to form grooves, or textures of substantially concentric circles (average surface roughness Ra≦10 nm). This substrate is immersed in a hydrogen peroxide aqueous solution ($H_2O_2$), and then dried. In addition, a thin film oxide layer $NiO_x$ is formed on the surface of this Ni-P substrate (hereinafter, referred to as the $H_2O_2$-treated substrate).

The surface of another aluminum/Ni-P disk is worked with diamond abrasive power to have textures formed thereon. This Ni-P substrate similar to the previous substrate is immersed in nitric acid so that the oxide layer naturally formed in air by heat during the substrate working can be dissolved by etching. Then, it is rinsed with pure water, and dried (this substrate is hereinafter referred to as the $HNO_3$-treated substrate).

Figure 1:
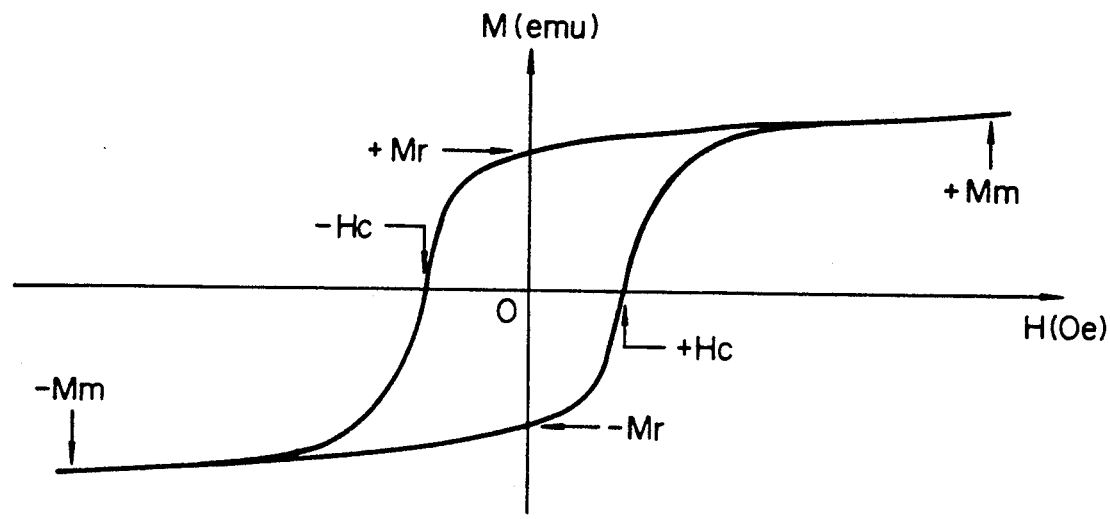
FIGS. 1 and 2 are diagrams showing magnetic characteristics.
Figure 2:
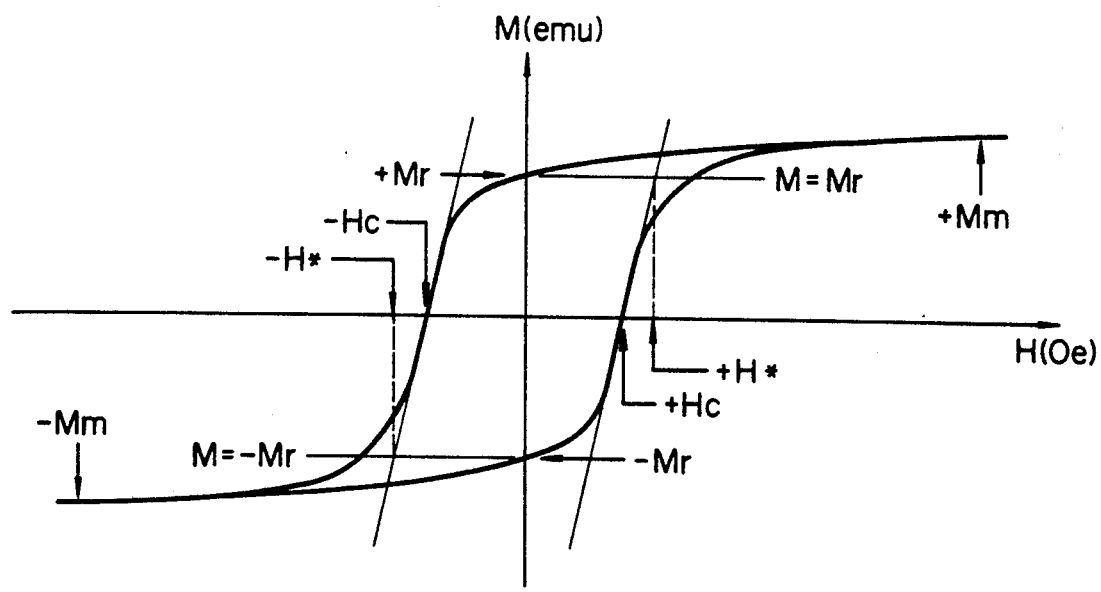
Figure 3:
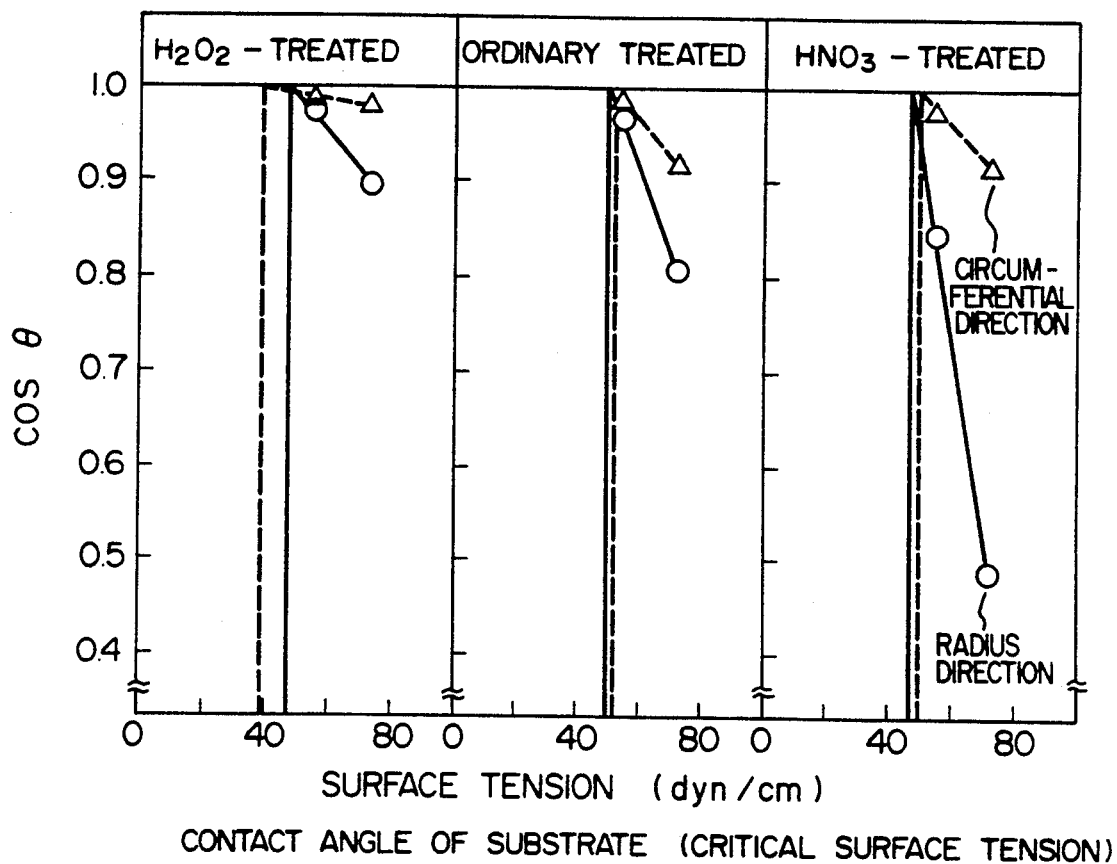
FIG. 3 is a diagram showing the measured results of contact angles of variously treated substrates.
Figure 4:
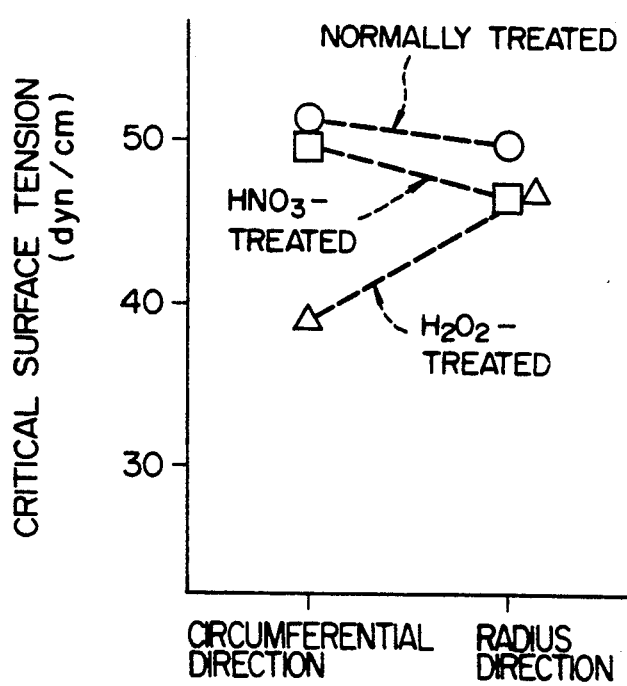
FIG. 4 is a diagram showing the critical surface tension of variously treated substrates.

FIG. 3 shows the measured results of the contact angle of the above two treated substrates and a common texture-provided substrate (not immersed in acid). Liquid drops of water (surface tension of 72.8 dyne/cm) and formaldehyde (surface tension of 58.2 dyne/cm) were used. The critical surface tension was obtained by externally inserting from the points of two surface tension values onto the line of cos $\theta = 1$ in this measured result (the two values corresponding to the broken line and solid line in FIG. 3). FIG. 4 shows the result. From the result, it will be understood that the $H_2O_2$ treated substrate has a large critical surface tension in the radius direction and is thus easy to be wetted in that direction differently from the other substrates.

Figure 5:
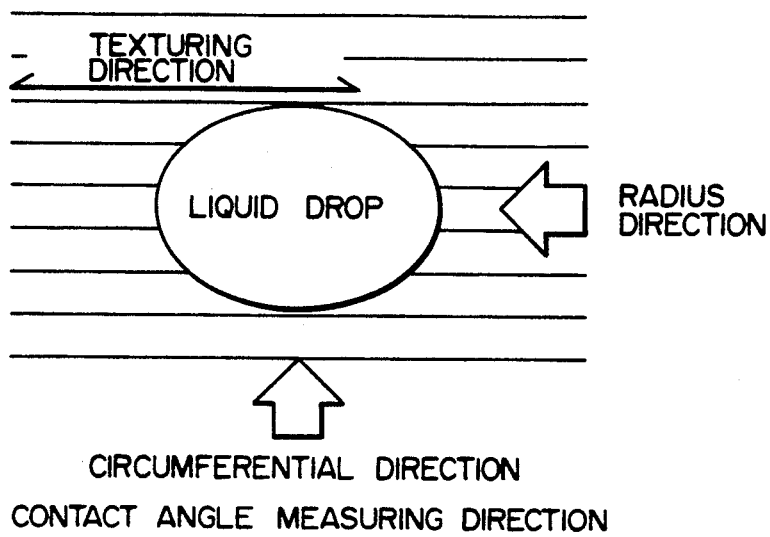
FIG. 5 is a schematic diagram showing the shape of a liquid drop on the substrate surface.

This can also be understood from the way of the actual wetting spread of the liquid drops. The liquid drop on the nontreated substrate and $HNO_3$-treated substrate spreads in the circumferential direction as shown in FIG. 5. On the other hand, the drop on the $H_2O_2$ treated substrate spreads longitudinally long in the radius direction (not shown). This means that the nontreated substrate and $HNO_3$ treated-substrate have a large surface tension corresponding to surface free energy in the circumferential direction, will the $H_2O_2$-treated substrate has a large surface tension corresponding to surface free energy in the radius direction.

When a nonmagnetic metal layer, or a chromium layer is formed on these substrates, the surface anisotropy of the surface tension corresponding to the surface free energy affects this chromium layer.

Figure 6:
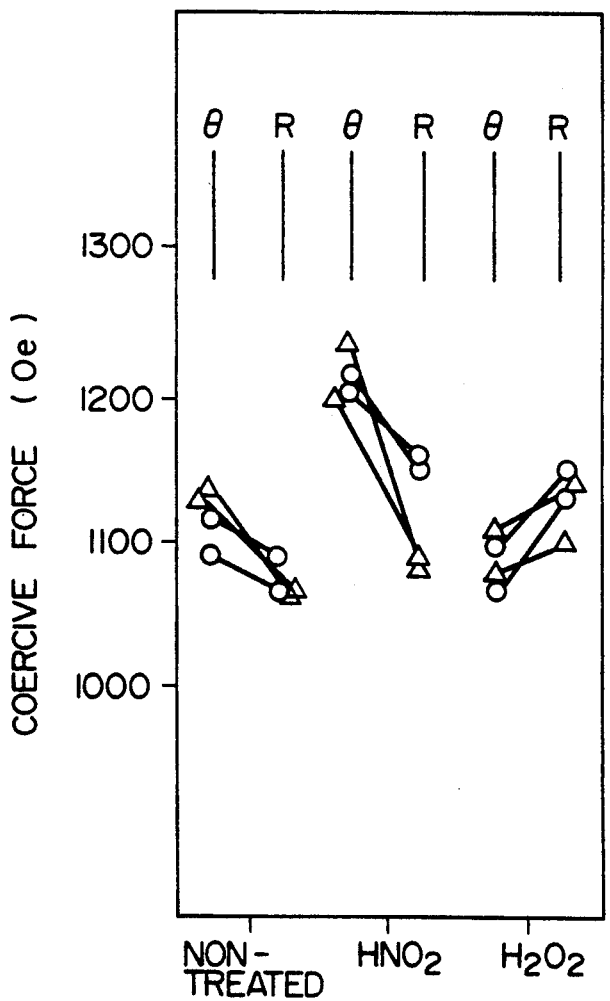
FIG. 6 is a diagram showing the magnetic characteristics of the magnetic recording medium of one embodiment of this invention.

That is, sputtered films 2, 3, 4 was formed on each of the substrates under the same conditions, and the magnetic characteristics were examined. FIG. 6 shows the coercive force measured in two directions (radius direction and circumferential direction) perpendicular to each other in a plane). In FIG. 6, $\theta$ is the coercive force in the circumferential direction, and R is the coercive force in the radius direction. In addition, when the films are formed on the vertically supported substrates, the coercive forces of the upper and lower portions are indicated by small white circles and the coercive forces of the left and right portions by small white triangles.

From FIG. 6, it will be understood that the $H_2O_2$-treated substrate has the anisotropy in a different direction from the others. The rectangular ratio and S* have the same tendency.

The surface roughness of the substrates in the same level. The texture pitch is also equal for these substrates. Therefore, the magnetic anisotropy is not affected directly by the roughness and texture pitch, or shape of the substrate surface, but in most cases, by some action which the surface shape causes.

As will be understood from the above results, in order to obtain the magnetic film having a main component of the easy axis of magnetization in parallel with the recording surface and with the recording direction (circumferential direction), it is preferable to provide textures of substantially concentrical circles to the $HNO_3$-treated substrate and provide textures to $H_2O_2$-treated substrate in the radius direction.

Figure 7:
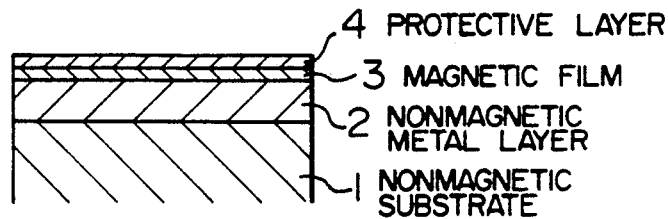
FIG. 7 is a cross-sectional diagram of a magnetic disk of the embodiment of this invention.

A method for producing a magnetic disk will be described below. FIG. 7 is a cross-sectional diagram of a produced magnetic disk. A nickel-phosphorus (Ni-P) alloy is deposited by electroless plating on an aluminum alloy flat base. This plated base is used as a nonmangetic substrate 1. In addition, the surface of this substrate is polished to a high precision with abrasive powder.

This substrate is worked to be provided with textures of substantially concentrical circles. It is immersed in nitric acid, rinsed with pure water, and then dried.

Another similar substrate after the polishing is worked to have textures in the radial shape (radius direction). In other words, while the substrate is being rotated at 60 rpm, its surface is worked by a disk-like working head which is rotated at 400 rpm around the rotating shaft separated relatively far from the center of the substrate. Thus, the substrate surface has textures of substantially a radial shape in the radius direction. This substrate is immersed in $H_2O_2$ solution, and dried.

For both substrates, the nonmagnetic metal layer 2 of chromium, magnetic layer 3 of cobalt alloy and protective layer 4 of carbon C are formed by continuous sputtering, and in addition a lubricant film (not shown) is formed for the purpose of reducing the friction or mutual action between the magnetic disk and the head, thus completing magnetic disks.

The circumferential coercive force of the magnetic disks was 1.1 to 1.2 times the radial coercive force.

In this embodiment, for providing the surface tension to the substrate having the surface anisotropy, the substrate was treated by a combination of a chemical process such as $H_2O_2$ process or $HNO_3$ process and a mechanical process such as the texturing. The surface tension effect was also obtained only by a rubbing process using an $HNO_3$-impregnated cloth or a chemical reaction process.

Embodiment 2

A surface treatment layer different from the Ni-P substrate material was formed on the same Ni-P substrate as used in embodiment 1. This layer is the carbon thin film that was sputtered under the following two conditions:

| Argon gas pressure | 2.5 mtorr |
| Power | 3 kW, 0.3 kW |
| Time | 3 sec, 20 sec |
| Thickness | 4.85 nm, 1.57 nm |

Figure 8A:
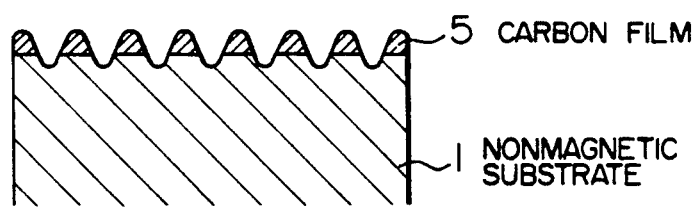
FIGS. 8A to 8C are diagrams showing the structure of the magnetic recording media of embodiments of the invention.

The surface of this surface treatment layer was provided with textures in the circumferential direction. Since the textured surface roughness was substantially equal to the thickness of the carbon film 5, or the surface treatment layer, the carbon film 5 was partially left on the nonmagnetic metal layer as shown in FIG. 8A. Thus, the surface tension corresponding to the substrate surface energy was provided with the surface anisotropy by different properties of the substrate and surface treatment layer.

Figure 8B:
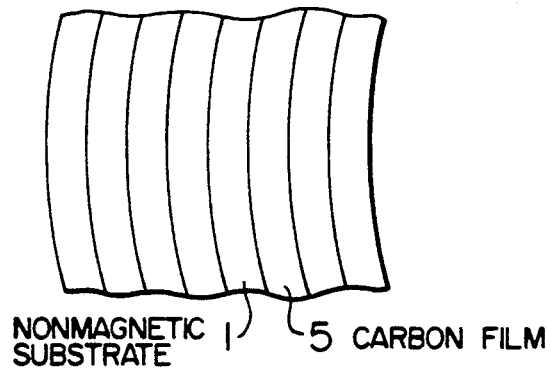

FIG. 8B shows the substrate surface having random shapes and stripes of alternate nonmagnetic metal layer 2 and the carbon film 5 resulting from partially removing carbon film 5 by the texture working.

The critical surface tension of the substrate was 52 dyne/cm in the circumferential direction and 32 dyne/cm in the radius direction. The coercive force of the magntic disk was 1420 Oe in the circumference direction, and 1014 Oe in the radius direction, or the ratio of the coercive forces in the circumferential direction and radius direction was 1.40.

Figure 8C:
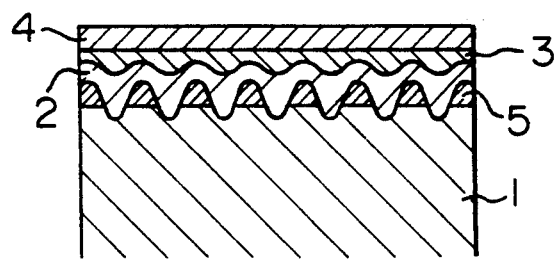

In this embodiment 2, the nonmagnetic metal layer, cobalt alloy magnetic film, carbon protective film and lubricant film were formed as in the embodiment 1. The cross-sectional structure of this magnetic disk of the embodiment 2 is shown in FIG. 8C.

Embodiment 3

A surface treatment layer NiOx of a different material was formed on the surface of the same Ni-P substrate as in the embodiment 1. This surface treatment layer was slightly oxidized to form an NiOx by irradiating with an ultraviolet ray under the presence of $O_3$ (hereinafter, referred to as UV/$O_3$) or by $O_3$ plasma. The conditions for this oxidization are as follows:

| (UV/$O_3$) | |
|---|---|
| $O_3$ concentration | 3 to 5% |
| Distance | 5 mm |
| Oxide film thickness | 5 nm |
| ($O_3$ plasma) | |
| Gas pressure | 0.2 torr |
| Gas flow | 150 s/cc/m |
| Power | 0.4 kW |
| Processing time | 20 sec |

Then, the surface treatment layer surface was provided with textures in the circumferential direction. The surface roughness due to the textures was equivalent to the thickness of the surface treatment layer. Thus, the surface tension corresponding to the substrate surface energy was provided with the surface anisotropy by the material difference between the substrate and the surface treatment layer.

The nonmagnetic metal layer of chromium, cobalt alloy magnetic film, carbon protective film and lubricant film were formed as in the embodiment 1, thus completing magnetic disks.

The critical surface tension of each of the produced substrates is as follows:

| (UV/$O_3$ treatment) | |
|---|---|
| Circumferential direction | 50 dyne/cm |
| Radius direction | 40 dyne/cm |
| ($O_3$ plasma treatment) | |
| Circumferential direction | 51 dyne/cm |
| Radius direction | 42 dyne/cm |

The coercive force of the magnetic disks is as follows:

| (UV/$O_3$ treatment) | |
|---|---|
| Circumferential direction | 1250 Oe |
| Radius direction | 1033 Oe |
| Ratio of circumferential to radius | 1.21 |
| ($O_3$ plasma treatment) | |
| Circumferential direction | 1270 Oe |
| Radius direction | 1094 Oe |
| Ratio of circumferential to radius | 1.16 |

Embodiment 4

While nitric acid was being dropped on the surface of the same Ni-P substrate as in the embodiment 1, a tape was rubbed against the substrate surface at a very small pressure in the circumferential direction. Then, this substrate was rinsed with pure water and dried. As a result, the substrate surface energy was increased in the circumferential direction, so that the anisotropy could be achieved.

As in the embodiment 1, the nonmagnetic metal layer of chromium, cobalt alloy magnetic film, carbon protective film and lubricant film were formed on the substrate, completing magnetic disks.

The ratio of circumferential to radius critical surface tension of the substrate was 1.21, the average surface roughness Ra was 3 to 4 nm, and the ratio of circumferential to radius coercive force of the magnetic disk was 1.20.

For comparison, a magnetic disk was produced by use of a conventional texture-provided substate. The ratio of circumferential to radius critical surface tension of the substrate was 1.06, the average surface roughness Ra was 7 to 8 nm, and the ratio of circumferential to radius coercive force of the magnetic disk was 1.06.

Figure 9:
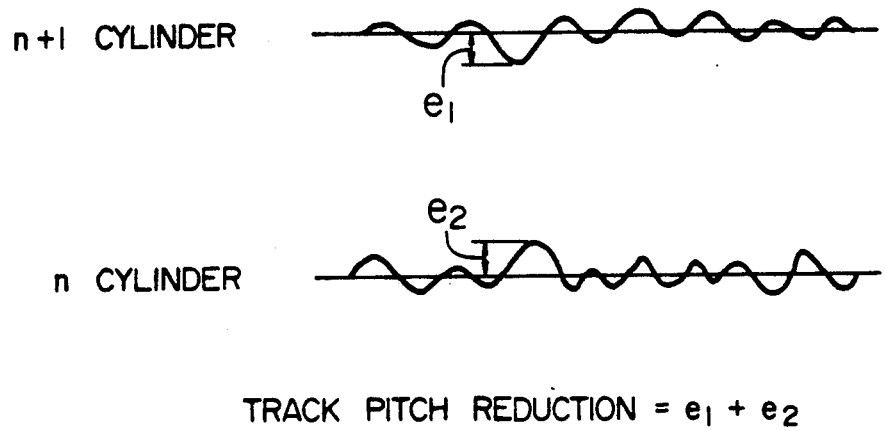
FIG. 9 is a diagram showing the amount of reduction of track pitch of the magnetic recording medium.

Since the magnetic disk according to this embodiment is very flat as compared with the conventional magnetic disk, the head can be floated with a very short distance from the disk surface. In addition, a uniform reproduced output was obtained from the disk of this embodiment. As a result, high output and high resolution was achieved. Moreover, when the head was located by data track, there was no erroneous detection and the data servo system was improved. In other words, the track pitch could be reduced to 0.3 $\mu$m at zero servo position error, while that in the prior art was 1.0 $\mu$m. The amount of reduction of track pitch is the sum of fluctuations $e_1$ and $e_2$ of the head as shown in FIG. 9. When this magnetic disk of this embodiment was operated on the drive, the characteristics were examined. The same result was obtained.

Embodiment 5

Figure 10:
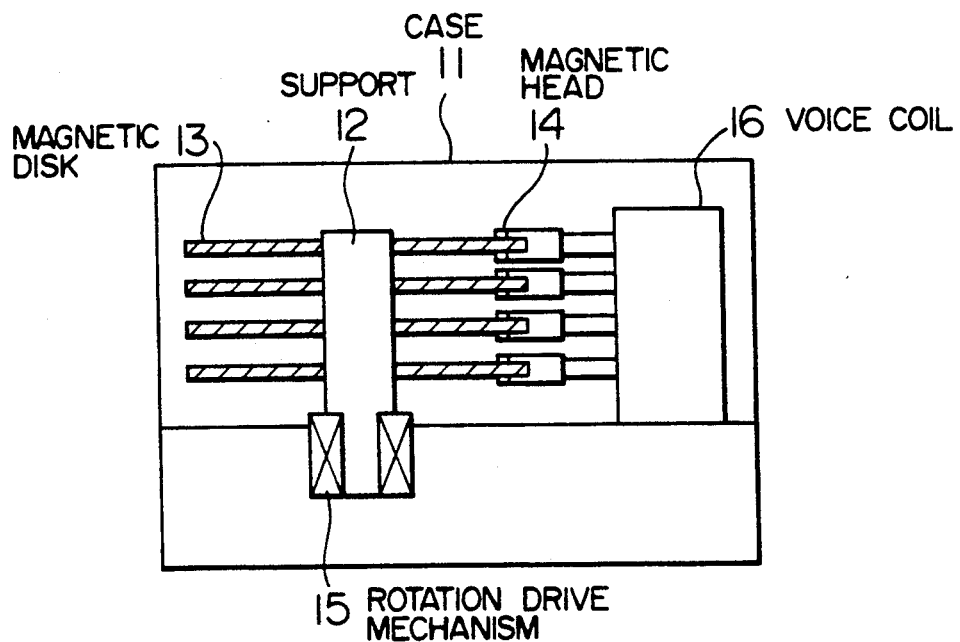
FIG. 10 is a schematic cross-sectional view of the magnetic recording apparatus as an embodiment of the invention.

FIG. 10 is a cross-sectional diagram of a magnetic recording apparatus. Magnetic disks 13 are mounted on a support 12 which is rotatable by a rotation drive mechanism 15. Magnetic heads 14 are carried, or flied at desired positions on the magnetic disks 13 by a voice coil 16. These components are housed in a case 11.

The magnetic disks produced according to the above embodiments were mounted on this magntic recording apparatus, and operated. As a result, it was found that these magnetic disks could be recorded at a high density and reproduced with good performance.

While each of the embodiments is a magnetic disk, this invention may be applied to magnetic tapes, magnetic cards and so on with the same effect.

We claim:

1. A magnetic recording medium comprising:
    a nonmagnetic substrate having different values of surface tension in a predetermined magnetic recording direction and in the direction substantially perpendicular thereto; and
    a magnetic film formed on said nonmagnetic substrate and having a main component of an easy axis of magnetization in said magnetic recording direction.

2. A magnetic recording medium according to claim 1, further comprising a nonmagnetic metal layer provided between said nonmagnetic substrate and said magnetic film.

3. A magnetic recording medium according to claim 2, further comprising a partial nonmetal layer provided between said nonmagnetic metal layer and said nonmagnetic substrate, said nonmetal layer is an oxide film layer of the material of said nonmagnetic substrate and has textures extending in said magnetic recording direction.

4. A magnetic recording medium according to claim 2, further comprising a partial nonmetal layer provided between said nonmagnetic metal layer and said nonmagnetic substrate, said nonmetal layer extending in said magnetic recording direction and having a partial discontinuous structure of which the width is substantially equal to the thickness of said layer in the direction perpendicular to said magnetic recording direction.

5. A magnetic recording medium according to claim 4, wherein said nonmagnetic substrate and said magnetic film are respectively made of nickel-phosphorus and cobalt, and said partial nonmetal layer is made of carbon.

6. A magnetic recording medium according to claim 1, wherein said nonmagnetic substrate and said magnetic film are respectively made of substantially nickel-phosphorus and cobalt.

7. A magnetic recording medium according to claim 1, wherein said nonmagnetic substrate has irregular surfaces with gradients of 45 degrees of ±10 degrees relative to the substrate surface.

8. A magnetic recording medium comprising;
a nonmagnetic substrate having different values of a surface tension; and
a magnetic film provided on said nonmagnetic substrate having a main component of an easy axis of magnetization parallel to a recording direction.

9. A magnetic recording medium according to claim 8, wherein a nonmagnetic metal layer is provided between said nonmagnetic substrate and said magnetic film.

10. A magnetic recording medium according to claim 8, wherein said surface tension is large in the recording direction.

11. A magnetic recording medium according to claim 8, wherein a surface tension of said nonmagnetic substrate is large in the recording direction.

12. A magnetic recording medium comprising:
a nonmagnetic substrate;
a layer of a material provided on said nonmagnetic substrate and having a surface tension; and
a magnetic film provided on said layer of said material and having a main component of an easy axis of magnetization parallel to the recording direction.

13. A magnetic recording medium according to claim 12, wherein a nonmagnetic metal layer is provided within said layer of said material.

14. A magnetic recording medium according to claim 12, wherein said layer of said desired material has textures in the recording direction, the depth of said textures being substantially equal to the thickness of said layer of a desired material.

15. A magnetic recording medium according to claim 12, wherein said surface tension is large in the recording direction.

16. A magnetic recording medium according to claim 12, wherein the critical surface tension of said layer of the material is large in the recording direction.

17. A magnetic recording medium according to claim 8, wherein the coercive force in the recording direction of said magnetic film is 1.1 times or larger than the coercive force in the direction perpendicular thereto.

18. A magnetic recording medium according to claim 8, said magnetic recording medium being a magnetic disk, said recording direction being a circumferential direction.

19. A magnetic recording medium according to claim 8, wherein said magnetic film has a coercive force of 1000 Oe or above in the recording direction.

20. A magnetic recording medium producing method comprising the steps of:
forming a nonmagnetic substrate having different values of surface tension in a predetermined magnetic recording direction than in the direction substantially perpendicular thereto;
forming on said nonmagnetic substrate a magnetic film having a main component of an easy axis of magnetization in said magnetic recording direction; and
forming a protective film on said magnetic film.

21. A magnetic recording medium producing method according to claim 20, further comprising a step for forming a nonmagnetic metal layer on said nonmagnetic substrate.

22. A magnetic recording medium producing method according to claim 20, further comprising a step for forming a partial nonmetal layer on said nonmagnetic metal layer, said nonmetal layer extending in said magnetic recording direction and having a partial discontinuous structure of which the width is substantially equal to the thickness of said layer in the perpendicular direction.

23. A magnetic recording medium producing method according to claim 20, wherein said nonmagnetic substrate and said magnetic film are respectively made of nickel-phosphorus and cobalt.

24. A magnetic recording medium producing method according to claim 20, further comprising a step for providing irregular surfaces of gradients of 45 degrees ±10 degrees on the surface of said nonmagnetic substrate.

25. A magnetic recording medium producing method according to claim 20, further comprising the steps of:
forming a nonmetal layer by oxidizing the surface of said nonmagnetic substrate; and
partially working said nonmetal layer to provide textures extending in said magnetic recording direction.

26. A magnetic recording medium producing method according to claim 25, wherein said nonmagnetic substrate and said magnetic film are respectively made of substantially nickel-phosphorus and cobalt and said partial nonmetal layer is made of carbon.

27. A method for producing a magnetic recording medium comprising the steps of:
providing a nonmagnetic substrate having different values of a surface tension; and
forming a magnetic film having a main component of an easy axis of magnetization parallel to a recording direction on said nonmagnetic substrate.

28. A method according to claim 27, said step of providing said nonmagnetic substrate comprising the steps of:
forming textures on the surface of said nonmagnetic substrate in the recording direction; and
immersing said nonmagnetic substrate in nitric acid.

29. A method according to claim 27, further comprising the steps of:
forming textures in a direction perpendicular to said recording direction on the surface of said nonmagnetic substrate;
immersing said nonmagnetic substrate in hydrogen peroxide aqueous solution; and
forming a magnetic film on said nonmagnetic substrate.

30. A method according to claim 27, further comprising the steps of:
forming a layer of a material on the surface of said nonmagnetic substrate;
forming textures in the recording direction on said layer of the material; and forming a magnetic film on said layer of the material.

31. A method according to claim 30, wherein said textures are so deep as to be substantially equal to the thickness of said layer of the material.

32. A magnetic recording apparatus comprising:

a magnetic recording medium including a nonmagnetic substrate having different values of surface tension in a predetermined magnetic recording and reproducing direction and in the direction substantially perpendicular thereto, and a magnetic film formed on said nonmagnetic substrate and having a main component of an easy-to-magnetize in said magnetic recording and reproduction direction;

a rotatable support for supporting said magnetic recording medium;

a rotation drive mechanism for rotating said support;

a magnetic head disposed to oppose a desired surface of said magnetic recording medium; and a voice coil for carrying said magnetic head to a desired position on said magnetic recording medium, said all said components given above being housed in a case.

* * * * *